United States Patent
Bietz et al.

[19]
[11] Patent Number: 5,791,502
[45] Date of Patent: Aug. 11, 1998

[54] PALLET RACK CROSSBEAM SAFETY LOCK

[75] Inventors: Dalton Bietz, Lodi; Bobbi MacNider, Corona, both of Calif.

[73] Assignee: Lodi Metal Tech., Inc., Lodi, Calif.

[21] Appl. No.: 696,040

[22] Filed: Aug. 13, 1996

[51] Int. Cl.$^6$ .................................................. A47B 43/00
[52] U.S. Cl. ........................................ 211/192; 403/316
[58] Field of Search ........................... 211/192, 191, 211/190; 248/221.12, 222.11, 222.12, 222.13; 403/315, 316, 393

[56] References Cited

U.S. PATENT DOCUMENTS

| | | | |
|---|---|---|---|
| 3,070,237 | 12/1962 | Fullerton et al. | |
| 3,144,944 | 8/1964 | McConnell. | |
| 3,392,848 | 7/1968 | McConnell et al. | 403/315 X |
| 3,512,653 | 5/1970 | Erismann | 211/192 |
| 3,545,626 | 12/1970 | Seiz | 403/315 X |
| 3,626,487 | 12/1971 | Seiz | 211/192 |
| 3,741,405 | 6/1973 | McConnell et al. | 211/192 |
| 4,262,809 | 4/1981 | McConnell | 211/192 |
| 4,496,061 | 1/1985 | Highsmith | 211/192 X |
| 4,904,110 | 2/1990 | Klein | 211/192 X |
| 5,350,074 | 9/1994 | Rosenband | 248/222.13 X |
| 5,498,097 | 3/1996 | Shapess | 403/315 X |
| 5,624,045 | 4/1997 | Highsmith et al. | 211/191 X |

*Primary Examiner*—Ramon O. Ramirez
*Assistant Examiner*—Stephen S. Wentsler
*Attorney, Agent, or Firm*—Mark C. Jacobs, Esq.

[57] ABSTRACT

A terminal section for a crossbeam attachable to a vertical column having a plurality of keyhole apertures, by such terminal section, as employed in rack storage systems, which terminal section features a pair of vertically spaced studs with a safety lock disposed through the terminal section therebetween. The safety lock includes a handle portion connected by a stud segment to a latch which is oppositely directed from the handle, such that when the studs and such latch are disposed in a trio of keyhole apertures of the vertical column, and when the handle is disposed downward the latch is upward whereby disengagement can not transpire until the handle is pointed up, and the latch down to permit separation of the terminal section from the vertical column.

9 Claims, 3 Drawing Sheets

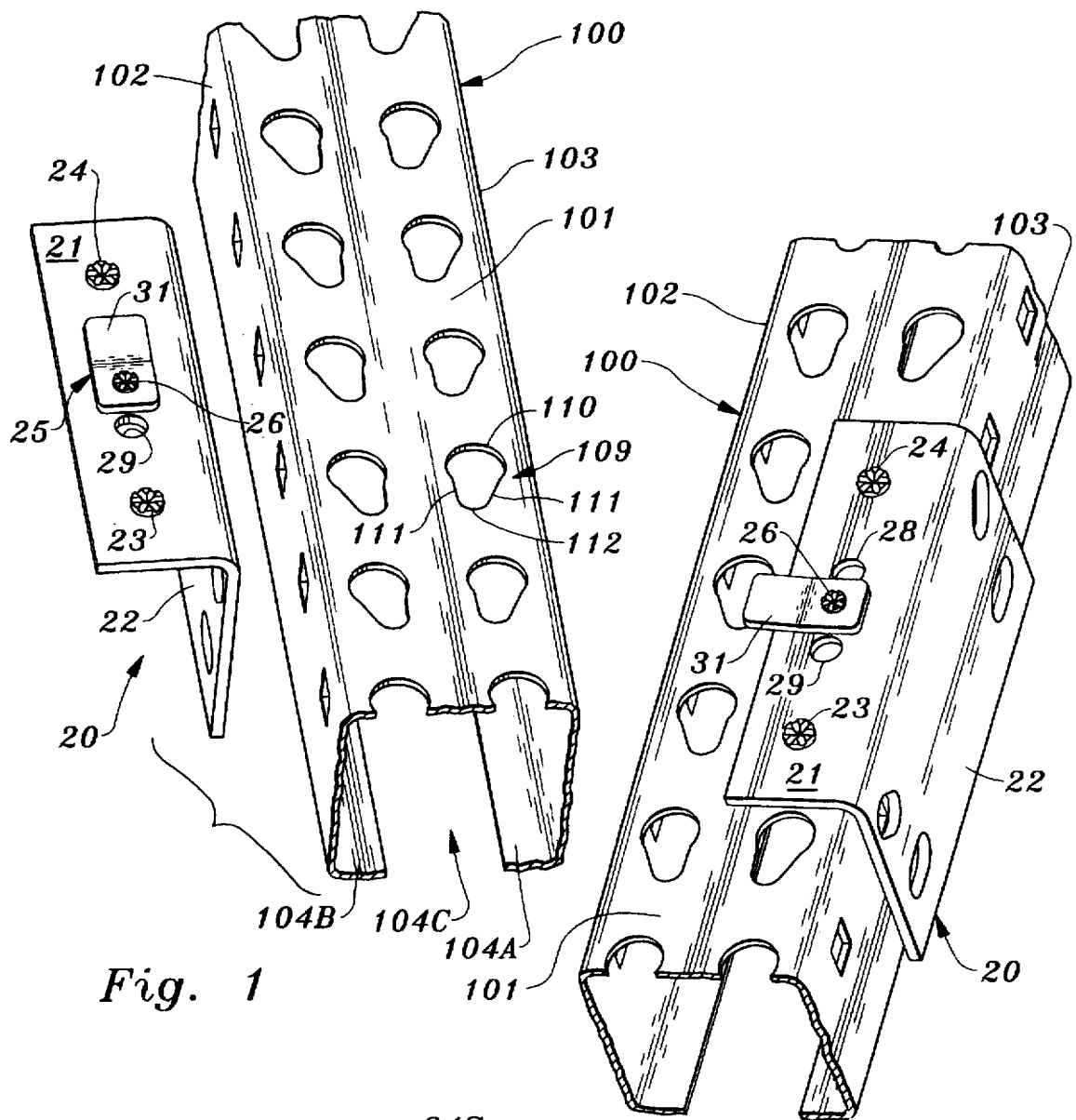
Fig. 1
Fig. 2
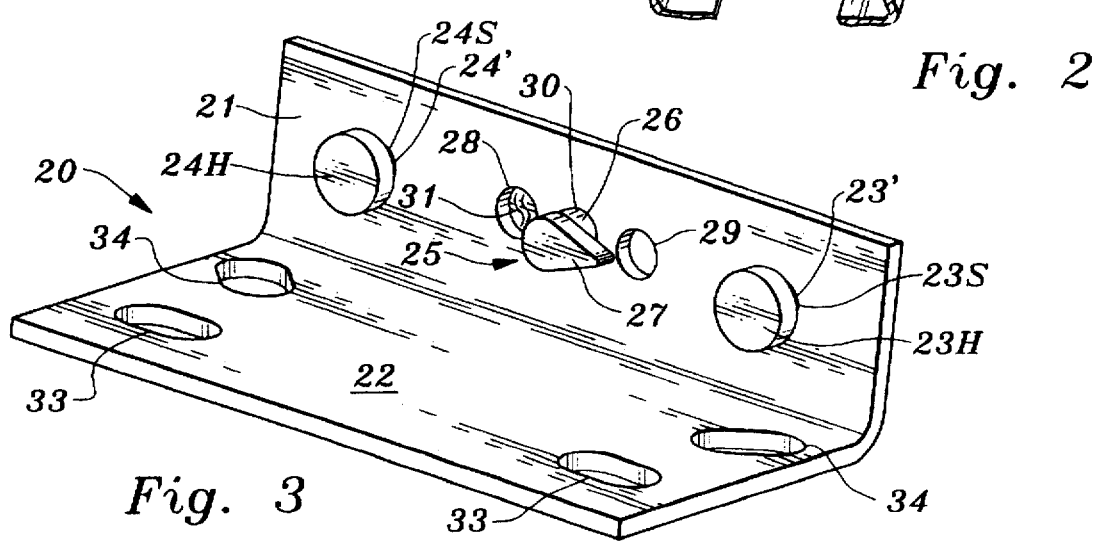
Fig. 3

5,791,502

PALLET RACK CROSSBEAM SAFETY LOCK

FIELD OF THE INVENTION

This invention relates to pallet rack storage systems and safety feature for same.

BACKGROUND OF THE INVENTION

Pallet rack storage systems have been available in the marketplace at least since the early 1960s. Such storage systems generally comprise a series of spaced vertical tubular members which are interconnected by a series of crossbeams. These crossbeams generally have ends having shaped protrusions called studs which extend away from the crossbeam for engagement in keyhole apertures on the vertical members. Typical of such constructions is the patent of Fullerton et al. U.S. Pat. No. 3,070,237 issued Dec. 25, 1962.

Another patent which features a similar construction means is that of McConnell, U.S. Pat. No. 3,144,944 issued Aug. 18, 1964.

By the late 1960s the need for a safety interlock or latch was recognized to help ensure that the crossbeams did not accidentally become disengaged from the vertical tubular member. One such means known to the applicants is that of McConnell et al as disclosed in U.S. Pat. No. 3,392,848. Here a spring clip pivoting member which passes through an opening in the terminal section of the crossbeam and a keyhole slot of the vertical column as well. The problem with this mechanism is the need to perfectly align three things to ensure a stable connection. Also the possibility exists that with age, the spring tension of the clip can be lost and/or the spring could break either of which can lead to a termination of the safety engagement.

Another connector means known to applicants is that of Erismann as disclosed and claimed in U.S. Pat. No. 3,512,653 issued May 19, 1970. The big problem with the safety latch of Erismann is the need for a supplementary locking pin which can only be used with specially modified slots on the vertical columns. The pin of Erismann will not work with pallet storage systems made by any of the three leading manufacturers of pallet rack storage systems as none of them use the modified vertical slot as required by the device of the Erismann patent.

Thus it was seen by applicants that there was indeed a need for a safety lock that would prevent disengagement of crossbeams from the vertical column of the storage system yet could be employed without the modification of existing storage systems.

It is an object therefore to provide a safety lock for the engagement of crossbeams to vertical columns of present and future pallet rack storage systems.

It is another object to provide a safety lock that is built-in and forms a part of the terminal section of the crossbeam.

It is yet another object to provide a safety lock that can engage unmodified keyhole slots (apertures) of vertical columns.

It is still another object to provide a safety lock that provides a visual indication of both the ability to disengage and the security of a safe interlock connection.

It is a still further object to provide a safety interlock for pallet rack storage systems that is easy to manufacture and is low in cost.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a front left perspective view of a portion of a vertical column and of a terminal section of a cross beam which terminal section includes the safety latch of this invention.

FIG. 2 is a front right perspective view showing the terminal section during the course of engagement with the vertical column, with the handle of the device pointing to a 9 o'clock position.

FIG. 3 is a rear perspective view of the terminal section with the latch of the invention in the downward removable position.

SUMMARY OF THE INVENTION

A terminal section for a crossbeam attachable by such terminal section, to a vertical column having a plurality of keyhole apertures, which section features a pair of vertically spaced studs with a rotatable safety lock disposed therebetween. The safety lock includes a handle portion connected by a stud segment to a latch portion. The latch is oppositely directed from the handle i.e., when the handle is disposed downward the latch is upward. When the section's studs and the latch are disposed in a trio of keyhole apertures of the vertical column, and the latch is upwardly directed, disengagement of the terminal section from the vertical column can not transpire, until the handle is pointed up, and the latch down.

DESCRIPTION OF THE PREFERRED EMBODIMENT

The terminal section of this invention can be mounted to any crossbeam to connect the crossbeam to a vertical column of a rack storage system. Since the crossbeam may be a box or even a round beam in cross section, and forms no part of the invention the beam per se with the terminal section at each end shall be considered conventional.

The terminal section of this invention may be either right or left facing as may be desired or needed. Thus a left-facing one is disposed at the left end of the crossbeam and a right-facing one at the right end of the crossbeam. In the illustrations of the figures only a left facing unit is shown, since the right counterpart would be a mirror image.

In order to better understand the use and operation of the locking device 25 of this invention, a brief description of the conventional vertical column of a rack storage system is beneficial. Such a column is seen in FIGS. 1, 2 and 5.

Figure 5:
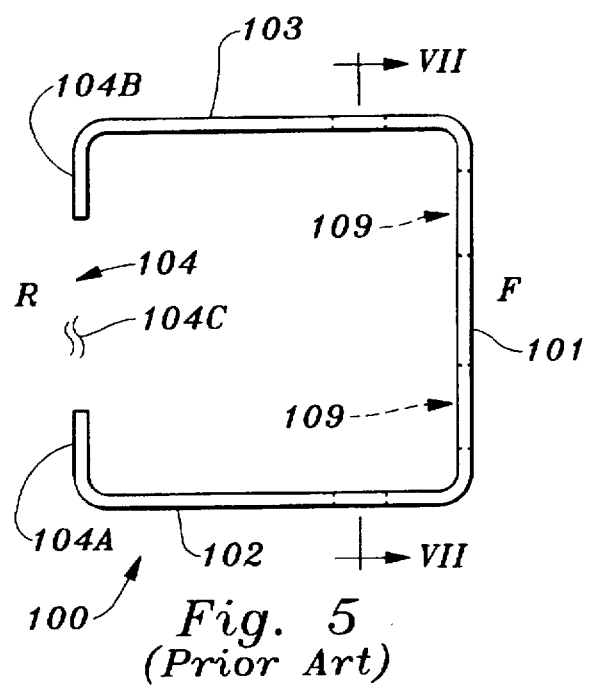
FIG. 5 is a top plan view of a typical vertical column used in a pallet rack storage system.

FIG. 5 is a top plan view of such a column. It is seen that column 100 is a generally box-like square structure usually open at the top and bottom, though cap members not shown are often employed. Column 100 includes a front face 101, a left sidewall 102 spaced from an opened right sidewall 103, and a pair of rear wall segments. These rear segments 104A and 104B merge with and emanate from each of the two sidewalls and are directed inward toward each other. A space 104C separates the two segments 104A and 104B. Any and all of the four corners may be rounded as shown. Sometimes space 104C is replaced by solid material to join segments 104A and 104B to render wall 104 continuous.

While each sidewall may contain and usually does contain keyhole apertures such keyhole apertures here are generally visible only in the front face, 101. See the figures.

As is seen two series of vertically spaced keyhole apertures 109 are found on the front face of the column 100. Each keyhole aperture 109 has an upper portion 110 of a generally circular shape which merges into a pair of spaced downwardly inclined sidewalls 111 which converge and merge with an arcuate bottom wall 112. Such keyholes as just described are deemed conventional in the pallet rack art for receipt of stud type column to beam connectors which studs are also deemed conventional.

The discussion now returns to FIGS. 1, 2 and 3 where the terminal section of this invention is seen. As with prior art units, section 20 which is generally L-shaped for the right-facing unit and generally mirror L for the left-face unit as shown here.

Figure 6:
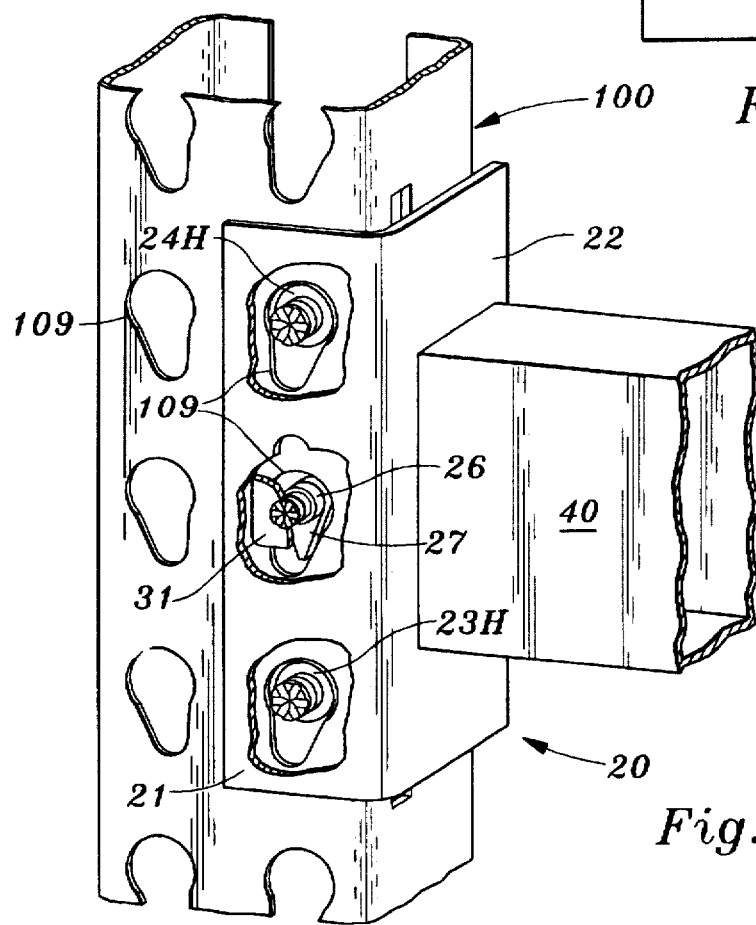
FIG. 6 is a right front perspective view showing a portion of a column and a terminal section attached to a portion of a crossbeam at the time of engagement of the terminal section to the column and prior to the locking engagement of one to the other.

Mirror L section 20 includes a front flange plate 21 and a side flange plate 22 normal to plate 21 but generally integrally formed therewith. Side flange 22 plate is attached as by welding or braising to a crossbeam 40 as is seen in FIG. 6.

Front flange plate 21 has a front face and a rear face and includes a pair of vertically spaced studs 24 and 23, mounted on the rear face thereof, the center point distance between them being equal to the center point distance between the first and third of three vertical keyhole apertures of the column.

A pair of optional throughbores 28, 29 vertically spaced from each other are found on the flanges plate 21 between the studs 24 and 23. These throughbores 28 and 29 are for the purpose of receiving an optional dimple found on the handle 31 to be described below.

Disposed between said throughbores 28, 29 is locking device 25, which has a handle 31, which handle is held in place by stud segment 26. Handle 31, has a front surface and a rear surface, and is preferably generally rectangular, and may have chamfered corners. Handle 31 has a first flat section, through which the stud segment 26 is disposed. The second section is preferably slightly forwardly inclined toward the user to both ease operation and to give a visual indication of the position of the handle. Further indicia such as an arrow can be stamped or painted on the upper section.

Dimple 31D, which may be optional, and which extends rearwardly perhaps a 1/16th of an inch or less from the rear surface of the handle is intended to impede the rotation of the handle, by acting as a drag to prevent unwanted rotation of the handle. When the handle is placed in either the fully locked or fully unlocked position, the dimple 31D will be received by one of the throughbores, 28, 29.

The stud segment 26, previously referred to, passes through stud bore 30 and is rotatable therein as well as being attached to latch 27. If elements 31, 26 and 27 are metal then they are attached as by braising or welding or other suitable means. If elements 31, 26 and 27 are a high impact plastic such as polycarbonate then conventional adhesive or other joining means may be employed. Preferably both said latch and said handle are spaced slightly from said flange for both ease of rotation of the handle and latch, and to aid gripability of said handle by a user.

If desired a shoulder 26S may be disposed on the stud segment 26 to prevent forward and rearward movement of the stud segment 26 within the bore 30. See FIG. 4.

Latch 27 may be a generally flat rectangular member, per FIG. 2, or preferably it is a tear drop shaped member, which in either case, is mounted off center on stud segment 26. The first extended section 27X directed in the opposite direction from the direction of disposition of the handle 31, has a greater linear extension than element 27R, which is the second section of the latch. Again see FIG. 4. It is the extended section 27X that actually locks the terminal end of the crossbeam in place to prevent removal as will be discussed below.

Figure 4:
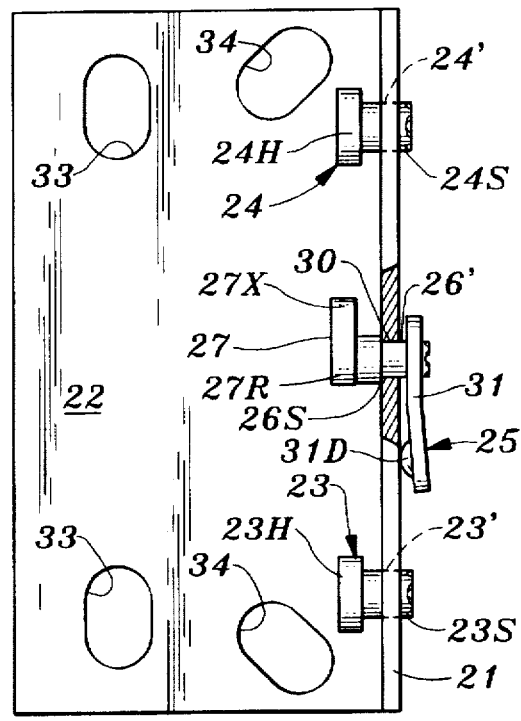
FIG. 4 is a side elevational view of the terminal section of a cross beam where the handle of the safety latch is in the 6 o'clock or locked position with the latch member pointing in the opposite or 12 o'clock position.

As seen in FIG. 4, studs 24 and 23 are welded in place through bores 23' and 24'. These studs include a shaft portion 23S, 24S, integrally connected to a slightly greater diameter head portion 23H, and 24H respectively.

The optional spaced elongated apertures 33 and the oppositely directed angled elongated apertures 34 serve no function with respect to the operation of this invention. The former are present merely for the attachment of a clip during the painting process, while the angled latter apertures serve as drains for accumulated water collected in the crossbeam itself.

FIG. 5 is a top plan view of a typical prior art column as is used in conjunction with the device of this invention. Column 100 is seen to have a front face 101 spaced from rear wall 104 and a pair of opposed normally disposed sidewalls 102 and 103. Front wall includes a pair of horizontally spaced series of vertically spaced keyhole apertures 109, seen here in dashed line. The rear wall 104 is seen to include a pair of spaced wall segments 104A and 104B separated by a large vertical slot 104C. All four corners may be rounded as is customary in the trade.

FIG. 6 is a right front perspective view showing the two plates of the terminal section 20 attached to the crossbeam 40, the two stud heads 24H and 23H disposed within their respective keyhole apertures and the latch disposed in its entry position within its keyhole aperture. The keyholes are visible only because areas of the front plate 21 have been cutaway. For ease of understanding elongated aperture sets 33, 34 have been omitted since they are nonfunctional relative to this invention.

Figure 7:
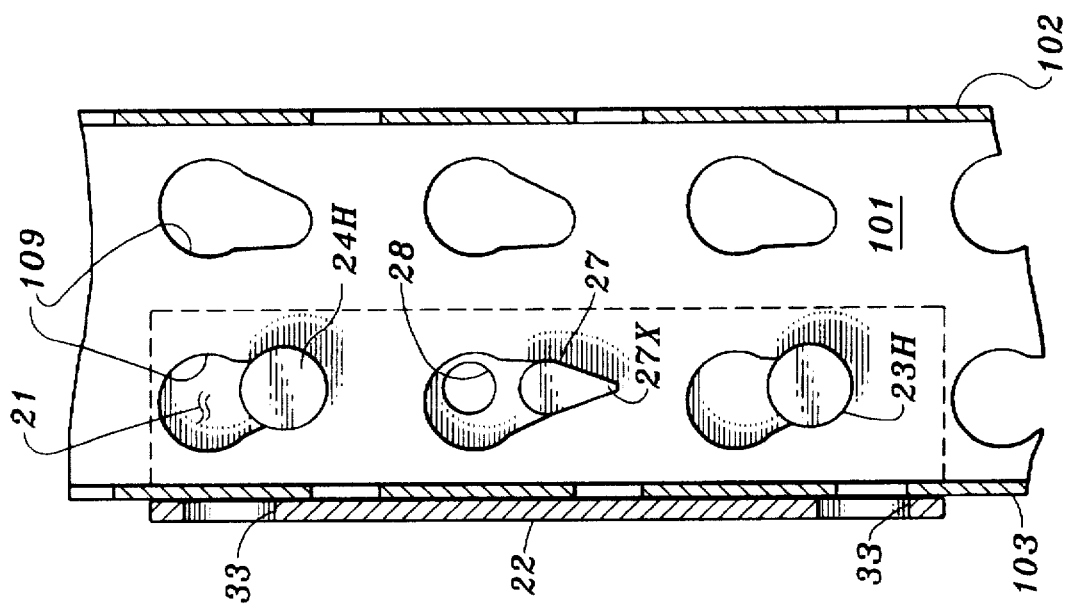
FIG. 7 is a rear elevational view of a column, taken along line VII—VII of FIG. 5 and showing the engagement of the terminal section of the crossbeam to the column and the disposition of the latch of this invention in the removable position.

FIG. 7 is a view taken along the line VII—VII of FIG. 5. That is, one is viewing the rear face of the front wall of the vertical column 100, just after the terminal end of the crossbeam is mounted into position. Section 27X of the latch 27 is seen to be pointing downward, while stud heads 23H and 24H are seen in their normally disposed at rest position, just after conventional insertion. That is, the point in time of this view is mere seconds after the insertion procedure as shown in progress in FIG. 6.

Figure 8:
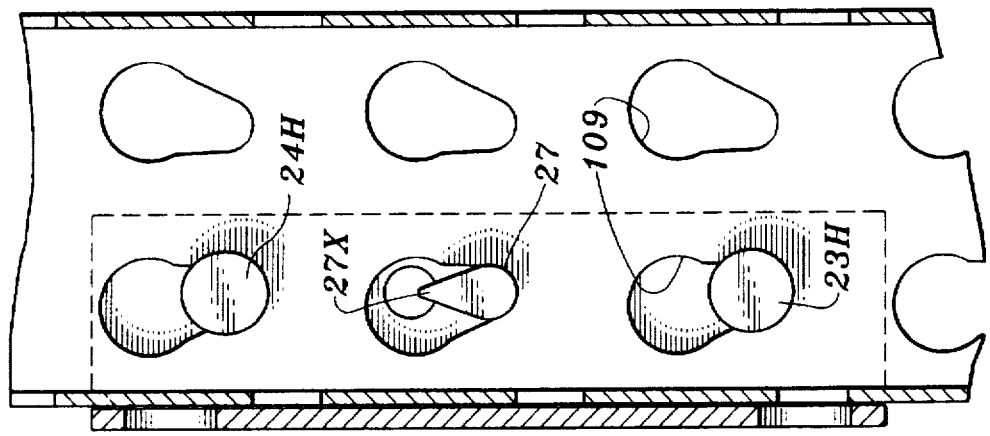
FIG. 8 is a rear elevational view of a column, similar to FIG. 7 and also showing the engagement of the terminal section of the crosbeam's stud heads to the column and the disposition of the lock of this invention, but in the latched or locked position.

FIG. 8 is a view similar to FIG. 7, but at a moment in time later, after the handle 31 has been rotated downwardly such that the latch 27 points upwardly. The stud heads 23H and 24H are in the same position as shown in FIG. 7. By having the handle be in the down position for the latch to be in a locked position, any effect of gravity or an incidental striking of the handle to move it possibly downward will mandate that the latch be engaged, and stays engaged. Thus when the latch 27 is in the upward position the removal of the terminal section from the vertical column is prevented. See FIG. 8.

Figure 9:
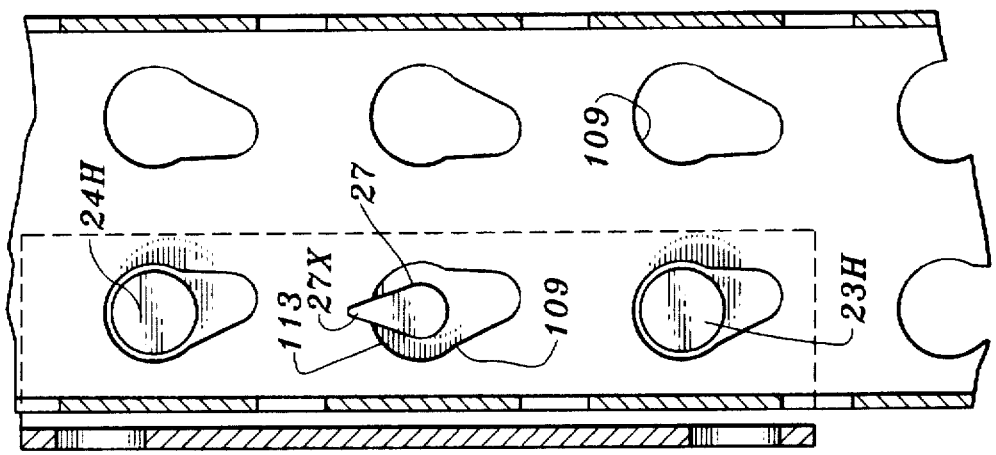
FIG. 9 is a rear elevational view of a column, related to FIGS. 7 and 8 but showing the terminal section in a relatively different disposition, and showing the disengagement of the terminal section of the crossbeam's stud heads from the column and the disposition of the latch of this invention, still in the latched or locked position.

When the terminal section 20 is raised up accidentally, to a location as in FIG. 9, and forward removal is attempted, the latch 27 remains in engagement with the top edge 113 of the keyhole aperture 109 into which the latch 27 has been inserted. This illustrates the positive safety feature of this invention. Compare the relative position of the terminal section 20 and the latch 27 in both FIGS. 8 and 9.

It is seen that there is disclosed a new safety lock which provides for retention of positive engagement of a keyhole aperture by the latch of the lock device when the handle of the lock device is in a downward disposition. Even if the studs become disengaged from their respective keyhole apertures, positive engagement with one keyhole by the locking device is retained.

The big advantage of this invention is cost. Columns need no modification to be employable with the device of this invention. No extraneous tools or removable parts that could get lost are involved. Everything is there in place permanently, and no training is required to understand how the invention works. Only a mere conventional insertion of the stud heads, with the handle upward (latch downward), followed by a slight movement downward,—so far the same as is conventional, is required. This is followed by a 180 degree rotation of the handle 31 to a downward disposition to turn the latch upward to prevent removability.

There is no criticality to be assigned to the shape of the handle, nor is there any criticality to the shape of the latch. Any offset mounted latch with an extension that positively catches an area of its keyhole when the studs are positioned for removal, serves to secure the terminal section in place. It is the relative disposition and size that achieves the desired result.

Since certain changes may be made in the above device without departing from the scope of the invention herein involved, it is intended that all matter contained in the above description, and shown in the accompanying drawings shall be interpreted as illustrative and not in a limiting sense.

I claim:

1. A crossbeam terminal section for attachment to a conventional vertical beam of a rack storage system, which vertical beam has a pair of horizontally spaced columns of a plurality of at least three vertically aligned teardrop apertures comprising a first teardrop aperture, a third teardrop aperture and a second teardrop aperture located between the first and third teardrop apertures, wherein each of said apertures has a circular upper portion with a center point, and a distance between the center points of adjacent teardrop apertures of each of the at least three vertically aligned teardrop apertures being equal to one another, said terminal section comprising:

an L-shaped section which includes a front flange plate and a side flange plate, the front flange plate having a front face and a rear face, and having a pair of vertically spaced studs on the rear face thereof, each stud of said pair of studs having a center point, the distance between the center points of said studs capable of being equal to a center point distance between the center point of the circular upper portion of the first teardrop aperture and the center point of the circular upper portion of the third teardrop aperture, said L-shaped section also having a fixedly mounted locking device, said locking device rotatable about an axis, said axis of said locking device disposed equally distant between said center points of said studs on said front flange plate, and wherein said locking device is adapted to cooperate with the second teardrop aperture of the at least three teardrop apertures to lock the L-shaped section in place.

2. The crossbeam terminal section of claim 1 wherein the fixedly mounted locking device comprises a handle attached to one end of a stud segment and spaced slightly from said front flange plate, which stud segment is disposed through said front flange plate and rotatable about said axis, and a latch mounted on the other end of said stud segment and said latch has an extended section oppositely directed from said handle and laterally spaced from said axis and spaced slightly from said front flange plate.

3. The crossbeam terminal section of claim 2 wherein the handle is generally rectangular.

4. The terminal section of claim 2 wherein the stud segment of said locking device is disposed through a stud bore in the front flange plate, and said stud segment includes a shoulder that acts as a spacer disposed around said segment between one of said handle and said latch, and the front flange plate, to prevent fore and aft movement of said handle relative to said front flange plate.

5. A combination of a crossbeam and a vertical beam, said vertical beam comprises at least one column of a plurality of at least three vertically aligned teardrop apertures comprising a first teardrop aperture, a third teardrop aperture and a second teardrop aperture located between the first and third teardrop apertures, each of said apertures have a circular upper portion with a center point, and a distance between the center points of adjacent teardrop apertures of each of the at least three vertically aligned teardrop apertures being equal to one another, a front flange plate secured to an end of the crossbeam, a pair of headed studs secured to said flange plate, each stud of said pair of studs having a center point, the distance between the center points of said studs is equal to a center point distance between the center point of the circular upper portion of the first teardrop aperture and the center point of the circular upper portion of the third teardrop aperture, a fixedly mounted locking device, said locking device rotatable about an axis, said axis of said locking device disposed equally distant between said center points of said studs on said front flange plate, and wherein said locking device is adapted to cooperate with the second teardrop aperture of the at least three teardrop apertures to lock the crossbeam to the vertical beam when one of said pair of studs engages the first teardrop aperture and the other of said pair of studs engages the third teardrop aperture.

6. The combination of claim 5 wherein the locking device comprises a handle attached to one end of a stud segment and spaced slightly from said front flange plate which stud segment is disposed through said front flange plate and rotatable therein about said axis, and a latch mounted on the other end of said stud segment and said latch has an extended section oppositely directed from said handle and laterally spaced from said axis and spaced slightly from said front flange plate for engagement with the second teardrop aperture.

7. The combination of claim 6 wherein the stud segment of said locking device is disposed through a stud bore in the front flange plate, and said stud segment includes a shoulder that acts as a spacer disposed around said segment between one of said handle and said latch, and the front flange plate to prevent fore and aft movement of said handle relative to said front flange plate.

8. The combination of claim 6, whereby when said one of said pair of studs engages the first teardrop aperture and said other of said pair of studs engages the third teardrop aperture, and the locking device engages the second teardrop aperture, and the handle is rotated to a locked position, the front flange plate cannot be removed from the vertical beam.

9. A crossbeam terminal section for a rack storage system, which storage system utilizes a vertical beam having a plurality of at least three vertically aligned teardrop apertures comprising a first teardrop aperture, a third teardrop aperture and a second teardrop aperture located between the first and third teardrop apertures, each of said apertures have a circular upper portion with a center point, and a distance between the center points of adjacent teardrop apertures of each of the at least three vertically aligned teardrop apertures being equal to one another, said terminal section comprising:

a front flange plate having a front face and a rear face, and having a pair of spaced studs on the rear face thereof, each stud of said pair of studs having a center point, the distance between the center points of said studs capable of being equal to a center point distance between the center point of the circular upper portion of the first teardrop aperture and the center point of the circular upper portion of the third teardrop aperture, a locking device disposed through the front flange plate, said locking device rotatable about an axis, said axis of said locking device disposed equally distant between said center points of said studs on said front flange plate, said locking device further comprises a handle portion connected by a stud segment to a latch having an extended section which is oppositely directed from the handle and laterally spaced from said axis, and wherein said crossbeam terminal section is capable of being locked to said vertical beam by disposing one of said pair of spaced studs in the first teardrop aperture, disposing the other of said pair of spaced studs in the third teardrop aperture, inserting the latch through the second teardrop aperture, and rotating the handle in a downward position thereby rotating the extended section of the latch in an upward position.

* * * * *